(12) United States Patent
Thakur et al.

(10) Patent No.: US 11,677,576 B2
(45) Date of Patent: Jun. 13, 2023

(54) SYSTEMS AND APPROACHES FOR ESTABLISHING RELATIONSHIPS BETWEEN BUILDING AUTOMATION SYSTEM COMPONENTS

(71) Applicant: Honeywell International Inc., Morris Plains, NJ (US)

(72) Inventors: Kushagra Thakur, Patna (IN); Harshad Damji, Bibwewadi (IN); Mehul Patel, Morris Plains, NJ (US); Hetal Shah, Acton, MA (US); Wendy Wise, Atlanta, GA (US); Benjamin Coleman, Minneapolis, MN (US); Parker Watson, Altadena, CA (US)

(73) Assignee: Honeywell International Inc., Charlotte, NC (US)

( * ) Notice: Subject to any disclaimer, the term of this patent is extended or adjusted under 35 U.S.C. 154(b) by 419 days.

(21) Appl. No.: 16/812,027

(22) Filed: Mar. 6, 2020

(65) Prior Publication Data
US 2020/0285203 A1 Sep. 10, 2020

Related U.S. Application Data

(60) Provisional application No. 62/815,195, filed on Mar. 7, 2019.

(51) Int. Cl.
| | |
|---|---|
| *G05B 15/02* | (2006.01) |
| *H04L 12/28* | (2006.01) |
| *G05B 13/02* | (2006.01) |
| *G05B 13/04* | (2006.01) |
| *G06N 3/08* | (2023.01) |

(Continued)

(52) U.S. Cl.
CPC ........ *H04L 12/2803* (2013.01); *G05B 13/029* (2013.01); *G05B 13/048* (2013.01);
(Continued)

(58) Field of Classification Search
CPC .... G05B 13/029; G05B 13/048; G05B 15/02; G06N 3/0427; G06N 3/08; G06N 5/02;
(Continued)

(56) References Cited

U.S. PATENT DOCUMENTS

2005/0192727 A1* 9/2005 Shostak .............. G07C 5/0808
701/1
2005/0278047 A1 12/2005 Ahmed
(Continued)

FOREIGN PATENT DOCUMENTS

EP 3236323 A1 10/2017

OTHER PUBLICATIONS

International Search Report and Written Opinion dated Jul. 10, 2020 for Application No. PCT/US2020/021585.

*Primary Examiner* — Tuan A Vu
(74) *Attorney, Agent, or Firm* — Seager, Tufte & Wickhem LLP

(57) ABSTRACT

Systems and methods for establishing relationships between building automation system components and controlling building automation system components. Data for a building automation system components may be received from the building automation system components and one or more models may be applied to the received data to determine types of the building automation system components and relationships between building automation system components. Once the types of building automation system components have been determined or identified, uniform names may be applied to the building automation system components. The received data may include, among other data, naming data and telemetry data from the building automation system components.

20 Claims, 6 Drawing Sheets

(51) Int. Cl.
   *G06N 5/02*    (2023.01)
   *G06N 5/04*    (2023.01)
   *G06N 3/042*   (2023.01)

(52) U.S. Cl.
   CPC ............... *G06N 3/042* (2023.01); *G06N 3/08* (2013.01); *G06N 5/02* (2013.01); *G06N 5/04* (2013.01); *G05B 2219/163* (2013.01); *G05B 2219/25011* (2013.01); *G05B 2219/2642* (2013.01)

(58) Field of Classification Search
   CPC .......... G06N 5/04; G06N 5/003; G06F 9/541; G06F 16/285; H04L 67/125; H04L 12/2803; G06V 20/52; G07C 5/0808; G08B 7/06
   See application file for complete search history.

(56) References Cited

U.S. PATENT DOCUMENTS

| | | | |
|---|---|---|---|
| 2011/0071685 A1* | 3/2011 | Huneycutt | G05B 15/02 700/275 |
| 2011/0087650 A1* | 4/2011 | Mackay | G05B 15/02 707/769 |
| 2014/0032555 A1* | 1/2014 | Kiff | G06F 16/285 707/737 |
| 2017/0115642 A1 | 4/2017 | Sridharan et al. | |
| 2018/0262573 A1* | 9/2018 | Przybylski | H04L 67/125 |
| 2018/0324393 A1* | 11/2018 | Ryan | G06V 20/52 |
| 2019/0122534 A1* | 4/2019 | McNutt | G08B 7/06 |
| 2019/0196795 A1* | 6/2019 | Cavalier | G06F 9/541 |
| 2020/0162354 A1* | 5/2020 | Drees | G06N 5/003 |

\* cited by examiner

SYSTEMS AND APPROACHES FOR ESTABLISHING RELATIONSHIPS BETWEEN BUILDING AUTOMATION SYSTEM COMPONENTS

This application claims the benefit of U.S. Provisional Application No. 62/815,195, filed Mar. 7, 2019. U.S. Provisional Application No. 62/815,195, filed Mar. 7, 2019, is hereby incorporated by reference.

TECHNICAL FIELD

The present disclosure pertains to building automation systems, and the like. More particularly, the present disclosure pertains to the organization and operation of the building automation systems.

BACKGROUND

Building automation systems may include building automation system components from one or more manufacturers. Over time, building automation system components may be replaced and/or repaired with components from one or more manufacturers. When building automation system components are from different manufacturers, building automation components performing similar operations and/or functions may have different network names due to the different manufacturers having different naming protocols and/or installers having different naming protocols. Of the known approaches and systems for utilizing building automation system components, each has certain advantages and disadvantages.

SUMMARY

This disclosure is directed to several alternative designs for, devices of, and methods of controlling, monitoring, managing, and/or operating building automation systems. Although it is noted that approaches and systems for controlling, monitoring, managing, and/or operating building automation systems are known, there exists a need for improvement to those approaches and systems.

According to one illustrative instance of the disclosed subject matter, methods, systems, and controller readable medium may be provided to establish relationships between building automation system components and to control the building automation system components. In some cases, data from the building automation system components may be received and one or more models may be applied to the data received. Based on results of applying the model to the data received, uniform names may be applied to the building automation system components and stored in a uniform name database. Further, based on the results of applying the model to the data received, one or more relationships between the building automation system components may be established and saved in the uniform name database and/or at one or more other suitable locations.

The above summary of some example embodiments is not intended to describe each disclosed embodiment or every implementation of the disclosure.

BRIEF DESCRIPTION OF THE DRAWING

The disclosure may be more completely understood in consideration of the following detailed description of various embodiments in connection with the accompanying drawings, in which.

Figure 1:
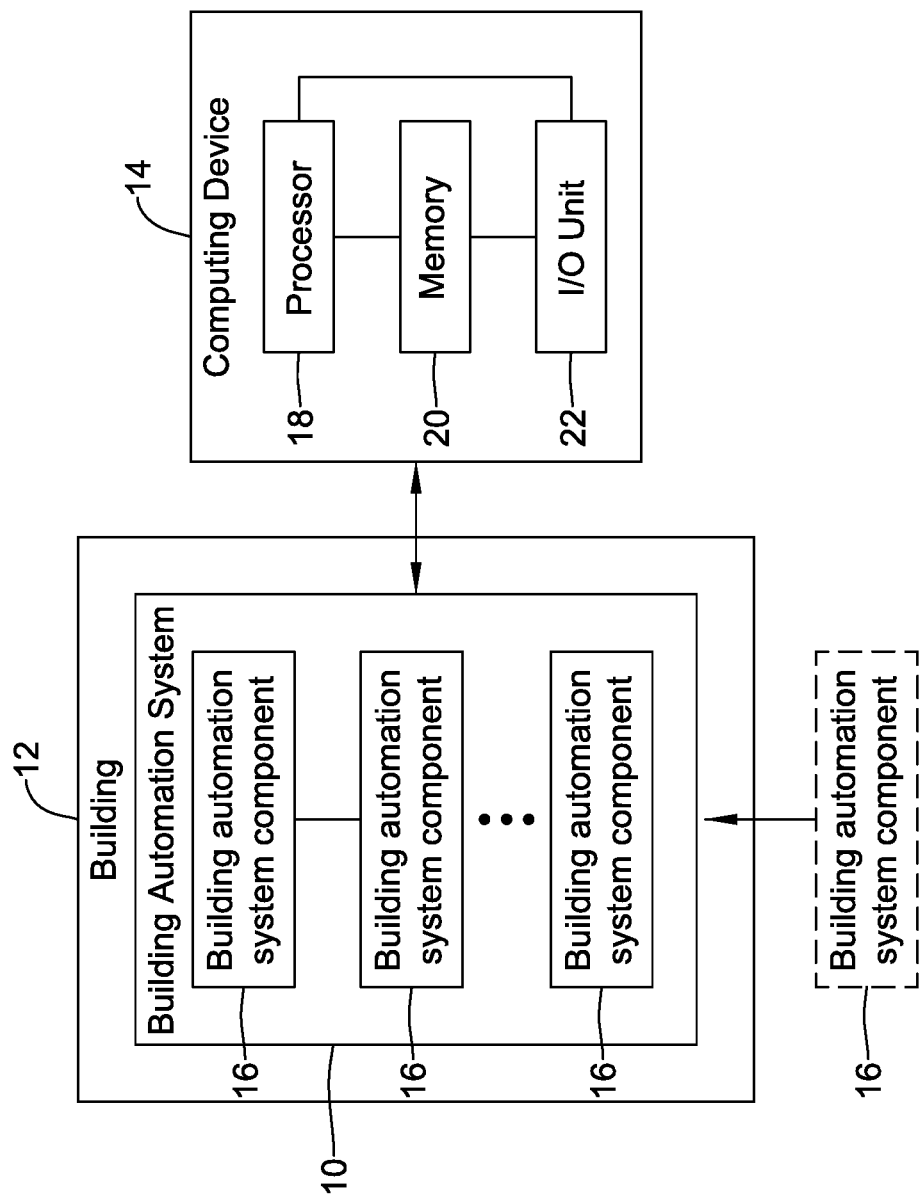
FIG. 1 is a schematic box diagram of an illustrative system for managing building automation system components.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Outcome based operation of outcome based services (OBS) (e.g., maintenance, control etc. services based on data from a building) for building automation systems configured to automate control of building operations (e.g., security, temperature control, lighting, etc. of buildings) may require an understanding of what building operation equipment is being utilized and how the equipment relates to one another. For example, it may be desirable to know information such as what is being controlled (e.g., air temperature, humidity, or flow, water temperature, electricity, gas, etc.), what types of equipment are being controlled (e.g., controllers, thermostats, lights, secured entry/exist systems, security systems, cameras, heating, ventilation, and air conditioning equipment, etc.), what types of sensors are providing data (e.g., pressure sensors, temperature sensors, position sensors, mass flow rate sensors, concentration sensors, binary state sensors, etc.), what types of signals are being transmitted between components (e.g., binary signals, digital signals, analog signals, multistate signals, etc.), what types of control functions are being utilized/monitored (e.g., set points, control operations, values of sensors, status of components, etc.) and/or other information suitable for facilitating operation of a building control or automation systems.

During an equipment installation process, installers may put in contextual information around the sensors in the sensor's name. For example, "VAV_1_22_10_SpaceTemp" may be a name of and may represent a space temperature sensor ("SpaceTemp") for a "Variable Air Volume" located in Room "1_22_10". As such, the naming convention may store a lot of information needed for advanced analytics and control.

Context and connectivity information about pieces of building operation and/or automation components and relationships among components may be important for maintenance, fault diagnosis, and/or otherwise control of the components (e.g., alarm prioritization, diagnostics, digital twin creation, maintenance workflows, etc.). In one example, component hierarchy may be important information needed for maintenance, fault diagnosis, and/or otherwise control of the components. To perform analytics for maintenance and/or control of the building operation and/or automation components, the components of a building may be identified and connections between the components may be determined. This "mapping" (e.g., creation of equipment hierarchy, creation of a knowledge graph, etc.) of the equipment of a building may be performed manually (e.g. by using a spreadsheet to enter or extract contextual information). Due to buildings utilizing large numbers of operational and/or automation equipment (e.g., often hundreds of pieces of equipment such as air conditioners, thermostats, etc., thousands of sensors for measuring parameters like temperature, airflow, pressure, etc., and/or other equipment), however, it often takes three (3) to five (5) weeks or longer to manually map out a building operation and/or automation system for use in the monitoring and/or operation of the system.

As a result of retrofits to buildings and/or for other reasons, buildings often include operation and/or automation components from various manufacturers and/or operation and/or automation components installed by various installers. In some cases, these various manufacturers and/or installers installing the various components may utilize different naming structures (e.g., different naming protocols) for similar functioning components, which may make it difficult to determine what a component is or what a function of a component is based on the naming structure of the component. This adds to the complexity of manually creating a map of building operation and/or automation components and how these components relate to one another. Thus, the current manual approach of identifying types of building operation and/or automation components may be time consuming and prone to human error. Attempts to automate the identification of building operation and/or automation components and create relationships between the components often rely on being able to recognize components based on specific naming conventions and/or protocols, which may result in not being able to identify a naming of a component that was not created according to one of the prescribed naming conventions/protocols.

To address these issues and/or other issues associated with identifying building operation and/or automation components and relationships between components to facilitate operation of the components, a context generation system has been developed to facilitate identifying building operation and/or automation components and relationships between identified components that may be independent of knowing specific naming protocols and/or convention. This context generation system may recognize patterns in name data associated with components of a building operation and/or automation system, telemetry data (e.g., time series data) for and obtained from and/or sent between the components, component schematics data, and/or other suitable data to predict or otherwise identify equipment type information, equipment role information, and/or equipment relationship information.

In some cases, learning algorithms (e.g., artificial neural network algorithms, cluster algorithms, etc.) may be utilized for identifying building operation and/or automation components and relationships thereof from the data. When learning algorithms are utilized, leveraging unstructured data, such as component schematics for example, may facilitate improving the accuracy of the learning algorithms in determining component type and component relationships and reducing the time needed to develop a map of the operation and/or automation components of a building.

Although the features described herein may be described with respect to building automation systems, the concepts may be utilized in other contexts. For example, the concepts described herein may be applied to any suitable industrial operation or control system or other suitable system in which it would be advantageous to identify components and relationships among those components to control and/or otherwise facilitate operation of the components and system.

FIG. 1 depicts a schematic box diagram of a building automation system 10 of a building 12, wherein the building automation system 10 may be in communication with a computing device 14. In some cases, the computing device 14 may be configured to receive data from the building automation system 10 and/or data related to the building automation system 10 from one or more other sources (e.g., a remote server and/or other suitable sources of data) to facilitate the monitoring and/or operation of the building automation system 10.

Although the computing device 14 is depicted in FIG. 1 as being separate from the building automation system 10 and the building 12, this is not required. For example, the computing device 14 may be part of the building automation system 10 and located within or exterior of the building 12, the computing device 14 may be separate from, but in communication with, the building automation system 10 and within the building 12, and/or the computing device 14 may be located at one or more other suitable locations and of or in communication with the building automation system 10. The computing device 14 may be configured to communicate with the building automation system 10 and/or components thereof through one or more wired or wireless networks. The wired and/or wireless networks may be local area networks (LAN) and/or wide area networks (WAN) (e.g., the Internet).

The building automation system 10 may be any suitable type of building automation system and may include any suitable components configured to facilitate operation and/or automation of the building 12. In some cases, the building automation system 10 may include one or more building automation system components 16. Further, over time, these building automation system components 16 may be switched out for other building automation system components 16 and/or additional building automation system components 16 may be added to the building automation system 10. The building automation system component 16 defined by a broken line may be representative of a building automation system components 16 added to or used to retrofit the building automation system components 16 of the building automation system 10.

The building automation system components 16 may be any suitable type of building automation system component. Example building automation system components 16 include, but are not limited to, controllers, thermostats, lights, secured entry/exist systems, security systems, cameras, motion detectors, heating, ventilation, and air conditioning (HVAC) equipment, pressure sensors, temperature sensors, humidity sensors, position sensors, mass flow rate sensors, concentration sensors, binary state sensors, etc.

The computing device 14 (e.g., a controller and/or other suitable computing device) may be any suitable computing device configured to process data of or for the building automation system 10 and/or facilitate control or operation of the building automation system 10. The computing device 14 may be a component of, or otherwise included in, the building automation system 10 and/or the computing device 14, or a portion of the computing device 14, may be a component separate from and in communication with the building automation system 10, as depicted in FIG. 1 and as discussed above. In some cases, the computing device 14 may communicate with a remote server and/or may be included in a remote server. Further, although not particularly depicted in FIG. 1, the building automation system components 16 and/or other components of the building automation system 10 may be or may include computing devices having components and features similar to those discussed herein with respect to the computing device 14.

The illustrative computing device 14 may include, among other suitable components, one or more processors 18, memory 20, and/or an I/O unit 22. Example other suitable components of the computing device 14 that are not depicted in FIG. 1 may include, but are not limited to, communication components, a user interface, a touch screen, a display screen, selectable buttons, a housing, and/or other suitable components of a controller. As discussed above, one or more components of the computing device 14 may be separate from the building automation system 10, as depicted in FIG. 1, and/or incorporated into the building automation system 10.

The processor 18 of the computing device 14 may include a single processor or more than one processor working individually or with one another. The processor 18 may be configured to execute instructions, including instructions that may be loaded into the memory 20 and/or other suitable memory. Example components of the processor 18 may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 20 of the computing device 14 may include a single memory component or more than one memory component each working individually or with one another. Example types of memory 20 may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 20 may be or may include a non-transitory computer readable medium. The memory 20 may include instructions executable by the processor 18 to cause the processor 18 to perform one or more of the methods and/or techniques described herein.

The I/O units 22 of the computing device 14 may include a single I/O component or more than one I/O component each working individually or with one another. Example I/O units 22 may be or may include any suitable types of communication hardware and/or software including, but not limited to, communication ports configured to communicate with electronic components of the building automation system 10, and/or communication ports configured to communicate with other suitable computing devices or systems. Example types of I/O units 22 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

Figure 2:
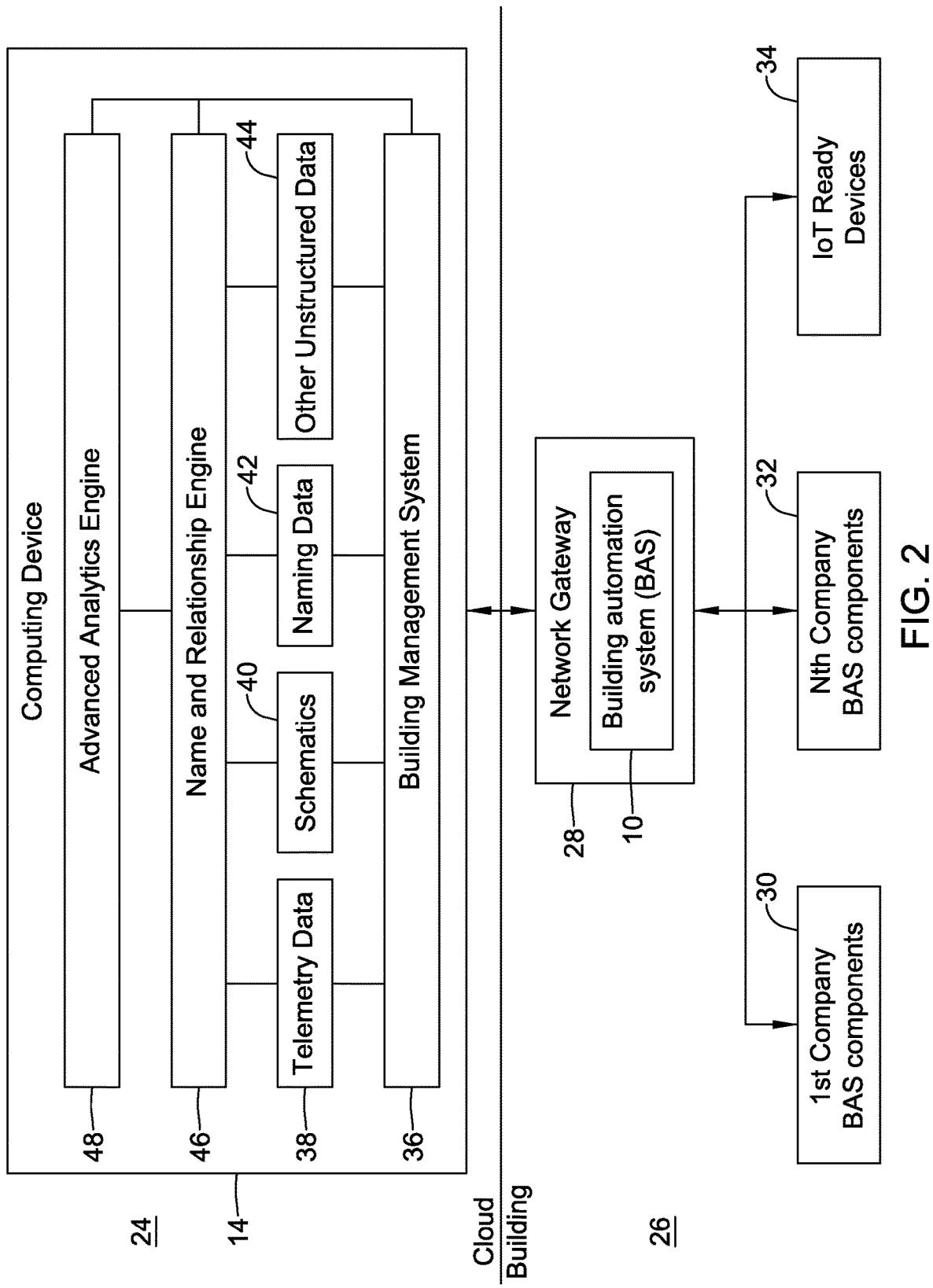
FIG. 2 is a schematic box diagram of an illustrative system for managing building automation system components.

FIG. 2 is a schematic box diagram depicting an illustrative instances of the computing device 14 located in a cloud environment 24 (e.g., in a remote server or remote computing device accessible through a WAN connection) that is in communication with the building automation system 10 at a building environment 26 (e.g., in a building 12) through a network gateway 28. In some cases, the building automation system 10 may have one or more first company building automation system components 30 (e.g., the building automation system components 16 from the first company and/or other suitable building automation system components), one or more $N^{th}$ company building automation system components 32 (e.g., the building automation system components 16 from an Nth company and/or other suitable building automation system components), and one or more internet-of-things (IoT) ready devices 34 (e.g., lights, thermostats, etc.), which may or may not include building automation system components from the first company or Nth company. Although the computing device 14 may be depicted as being in the cloud environment 24, this is not required and the computing device 14 may be at least partially included in the building automation system 10 and/or located at one or more other suitable locations.

The computing device 14 may be configured to include a building management system 36 that may receive data from the building automation system 10 through the network gateway 28. Example data that may be received at the building management system 36 may include, but is not limited to telemetry data 38 (e.g., time series data), schematics data 40, name data 42, and/or other suitable unstructured data 44 that may be utilized to facilitate identifying names or types of the building automation system components 16 and relationships between the building automation system components 16. The received data may be provided to a name and relationship engine 46 for determining or identifying names of components providing the data and establishing relationships or links between components providing the data and/or otherwise of the building automation system 10. Further, the results of name and relationship engine may be utilized by an advanced analytics engine 48 for monitoring, analyzing, and controlling the building automation system components 16 of the building automation system 10.

The telemetry data 38 may include, among other suitable data for (e.g., data of, related to, and/or data sensed by) the building automation system components 16. In one example, telemetry data 38 may be data related to a temperature of fluid flowing into and out of a building automation system component 16 (e.g., a boiler).

Figure 3:
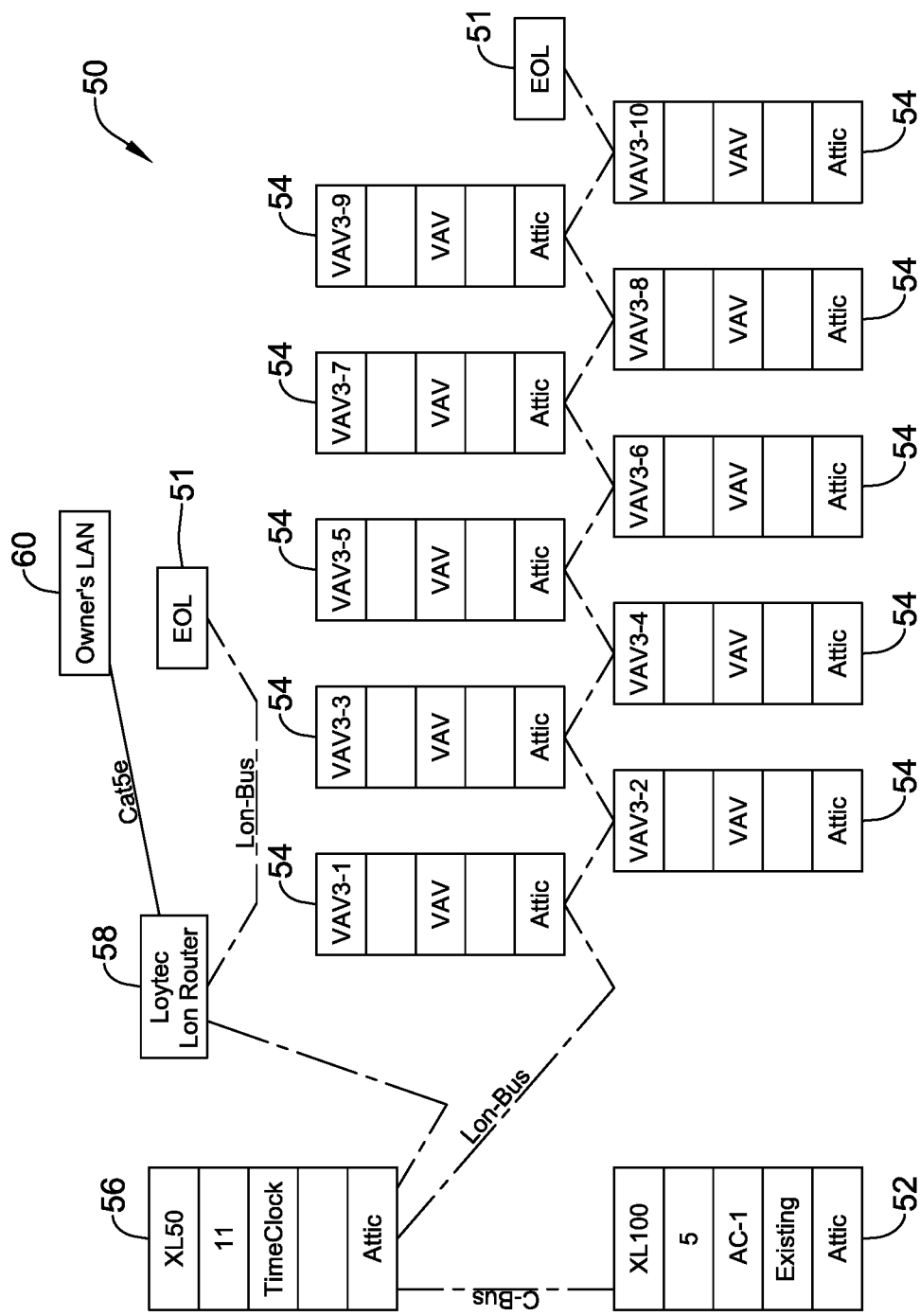
FIG. 3 is a schematic diagram of an illustrative layout of building automation system components.

The schematic data 40 may be computer readable diagrams (e.g., building information modeling (BIM) files and/or other suitable computer readable files). In some cases, the schematics data 40 may be utilized to teach a name and relationship engine 46 which naming structures or elements of naming structures describe which types of components and/or types of components that may be likely to be linked together (e.g. may be likely to have a relationship between one another). An example of schematic data is depicted in FIG. 3, which shows a schematic diagram 50 including an attic air condition unit 52 in communication with ten variable-air-volume (VAV) controllers 54 via a system controller 56. In some cases, for example to facilitate control, the system controller 56 may be connected to the internet via a wired or wireless connection with a router 58 in communication with a user's LAN 60. Based, at least in part, on the schematic diagram 50 in FIG. 3, the name and relationship engine 46 may be able to determine relationships between identified air conditioning units 52, VAV controllers 54, system controllers 56, routers 58, and user's LANs 60, among other suitable building automation system components 16. Note the boxes for EOL 51 in FIG. 3 represent the end of the line.

Naming data 42 may be or may include naming information applied to components by manufacturers and/or installers. In some cases, the naming data may include contextual information around the component name. For example, as discussed above, naming data for a component may be "VAV 1_22_10 SpaceTemp", which represents a space temperature sensor for a variable air volume located in room 1_22_10.

As such, one example naming protocol may be "[APPLICATION OF COMPONENT] [LOCATION OF COMPONENT] [COMPONENT TYPE]. An application of the building automation system component 16, generally, may refer to what the component 16 is controlling, sensing, or has an effect on. The location of the building automation system component 16 may refer to a physical location (e.g., a room, a superior component in which the relevant component is located, etc.) of the building automation system component 16. The component type may be what the building automation system component 16 is and/or a function of the building automation system component 16. The naming protocol for a building automation system component 16, however, may not be consistent among all building automation system components 16 and thus, a learning algorithm may be useful for detecting patterns in naming data 42 and/or telemetry data 38 and establishing uniform names for components (e.g., establishing names based, at least in part, on a uniform naming protocol).

The other unstructured data 44 may be any other suitable types of data provided by or relevant to the building automation system 10. The other unstructured data 44 may be utilized similar to the telemetry data 38, the schematics data 40, and the naming data 42 to facilitate identifying types of building automation system components 16 and relationships or links between building automation system components 16.

The name and relationship engine 46 of the computing device 14 may be configured to receive data from the building management system 36 or otherwise directly or indirectly from the building automation system 10. The name and relationship engine 46 may be configured to perform analyses on the data received from the building automation system 10 to identify types of building automation system components 16 and relationships or links between the building automation system components 16. In some cases, the name and relationship engine 46 may be configured to apply models or algorithms to the received data to identify types of building automation system components 16 and relationships or links between the building automation system components 16. Although not required, the algorithms or models applied to the received data for identifying types of building automation system components 16 and relationships or links between the building automation system components 16 may include learning algorithms. The learning algorithms may be or may be based, at least in part, on a Gaussian process, an artificial neural network, regression models, a recurrent neural network utilizing a gated recurrent unit (GRU) for teaching a machine learning model, an autoregressive integrated moving average (ARIMA) analysis, cluster analyses, rectified linear units (RELU), and/or other suitable algorithms, models, or algorithm or model types suitable for identifying patterns and/or relationships in data.

The advanced analytics engine 48 may be configured to receive the results of the name and relationship engine 46 (e.g., types of building automation system components 16 and relationships or links between building automation system components 16) and use the types of building automation system components 16 and the relationships there between to monitor operations of the building automation system components 16, identify maintenance needs of the building automation system components 16, and control or facilitate controlling operation of the building automation system components 16. In one example, the advanced analytics engine 48 may analyze the telemetry data 38 in view of the knowledge of types of and relationships between building automation system components 16 that may be received from the name and relationship engine 46 and in response, perform maintenance and/or fault diagnoses, prioritize alarms, provide diagnostics, create digital twins for building automation system components 16, create maintenance workflows, send control signals to adjust operation of the building automation system components, and/or take one or more other actions.

Figure 4:
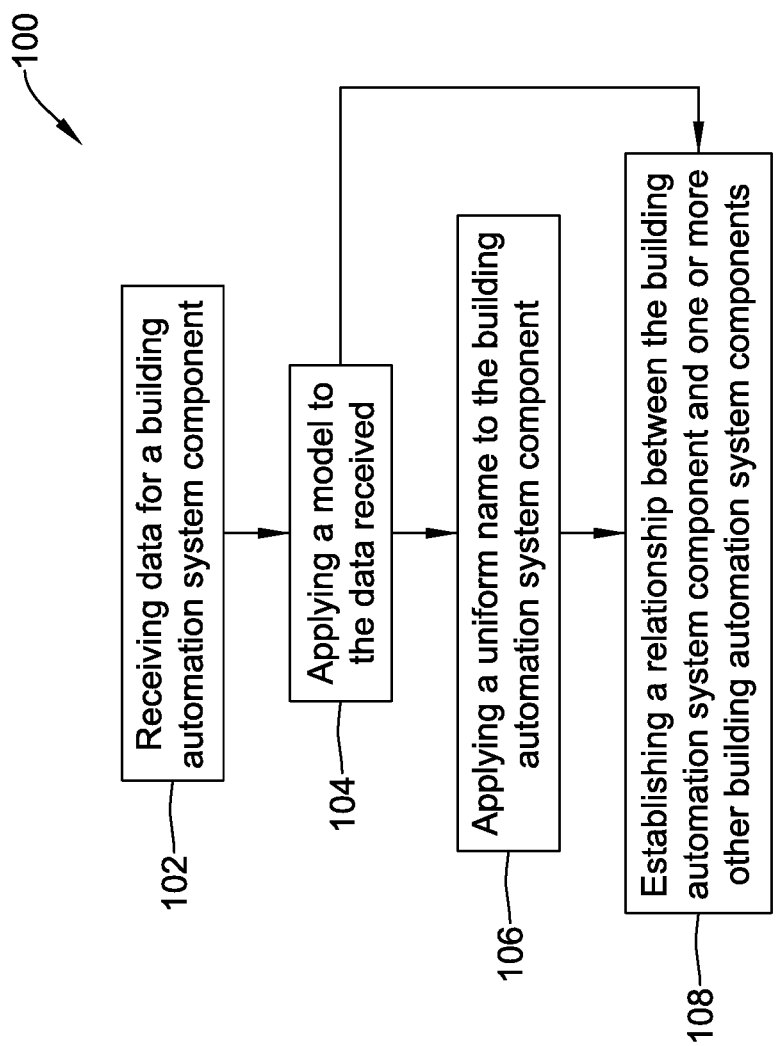
FIG. 4 is a schematic flow diagram of an illustrative method of establishing relationships between building automation system components.

FIG. 4 is a schematic flow diagram of an illustrative method 100 of identifying types of components (e.g., the building automation system components 16 and/or other suitable components) present in an operations system (e.g., the building automation system 10 and/or other suitable operations system) and establishing relationships between the components. The method 100 may include receiving data 102 from or for a building automation system component. The data received from the building automation system component may be received directly from the building automation system component at a computing device (e.g., the computing device 14 and/or one or more other suitable computing devices) or indirectly at a computing device. Although not required, the data received may be or may include telemetry data, schematics data, naming data, and/or other suitable unstructured data as discussed herein or otherwise.

The method 100 may further include applying 104 a model to the data received. Applying 104 the model to the data received may result in identifying a type of building automation system component associated with each piece of data received. To determine the type of building automation system component, the model may be applied to one or more of received naming data, telemetry data (e.g., time series data), schematics data, and/or other suitable unstructured data. In one example, the model may be applied to naming data and telemetry data to determine a type of a building automation system component. Other examples are contemplated.

Once the type of component associated with each piece of data received is known, a uniform name may be applied 106 to the building automation system component and this applied uniform name may be stored in a database at the computing device (e.g., in memory, such as the memory 20 and/or other suitable memory) or in a different computing device. The uniform name may be selected from a predetermined naming convention to facilitate ensuring all components of similar types are named similarly, such that an analytics system (e.g., the advanced analytics engine 48 and/or other suitable analytics system) may be able to properly analyze data from the uniformly named building automation system components. Although each uniform name may be different, the naming convention may have a consistent naming structure for all components. In one example, the naming convention may result in similar types of building automation system components having a similar type portion of a uniform name, similarly located building automation system components having a similar location component, etc.

Further, prior to, during, and/or subsequent to applying 106 the uniform names to the building automation system components, the method 100 may include establishing 108 a relationship between building automation system components based, at least in part, on the results of applying 104 the model to the data received for the building automation system components. Although the uniform name of the building automation system component may facilitate establishing relationships (e.g., knowing a first building automation system component is a boiler controller and a second building automation system is a water temperature sensor may assist in determining the first component and the second component have a relationship such that data from the second component may change with the change in the first component), this is not required and relationships between two or more building automation system components may be established without knowing types of the two or more building automation system components.

Establishing 108 relationships between the building automation system components may include creating an association between a building automation system component and at least one other building automation system component. The association may be created by adding the association (e.g., link) to a database (e.g., a lookup table, a knowledge graph, etc. stored in the memory 20 and/or other suitable memory) containing a configuration of the building automation system based, at least in part, on the uniform names applied to the building automation system components and the relationships between the building automation system components. In some cases, the database may include or may be a knowledge graph configured to provide a visual representation of the configuration of the building automation system, but this is not required. In some cases, the knowledge graph may include a visual representation of the uniform names for the various identified components and links between the various identified components representing the established relationships.

When applying 104 the model to the data received one or more models may be applied to the data received. In one example, a first model may be applied to the data received and a second model may be applied to the data received. The first model may be a naming model used to determine or identify a type of a building automation system component and applying 106 the uniform name to the building automation system component may be based, at least in part, on the results of applying the first model to the data received. The second model may be a relationship model used to establish relationships between building automation system components and establishing 108 the relationships between building automation system components may be based, at least in part, on the results of applying the second model to the data received. Although two or more models may be utilized when applying 104 the model to the data received, a single model may be utilized that may perform the function of separately applying a plurality of models to the data received.

In some cases, operations of building automation system components may be controlled based, at least in part, on knowing the uniform names applied to the building automation system components, knowing the relationship established between two or more building automation system components, or knowing both of the uniform names applied to the building automation system components and knowing the relationships established between two or more building automation system components. The controlling operation of the building automation system components may include sending control signals to building automation system components, sending control signals to a controller of a building automation system, and/or sending control signals or other suitable information to a computing device. The sent signals may provide control instructions to maintain or modify operation of the building automation system, trigger alarms, provide alarm details, perform diagnostics, create or provide digital twins, create or initiate maintenance workflows, etc. based, at least in part, on analyses of data received and/or other suitable data (e.g., historical data, etc.).

Although not required, the features of and features related to the method 100 may be automated using the computing device (e.g., the computing device 14 and/or one or more other suitable computing devices), the building automation system components, and one or more networks there between. The automation may be complete automation in which all steps of the method 100 and steps related thereto may be automated or one or more portions of the method 100 may be automated. Automation of the method 100 may facilitate reducing the time and manpower needed to map a building automation system and may facilitate control of building automation system components based, at least in part, on data from the components.

Figure 5:
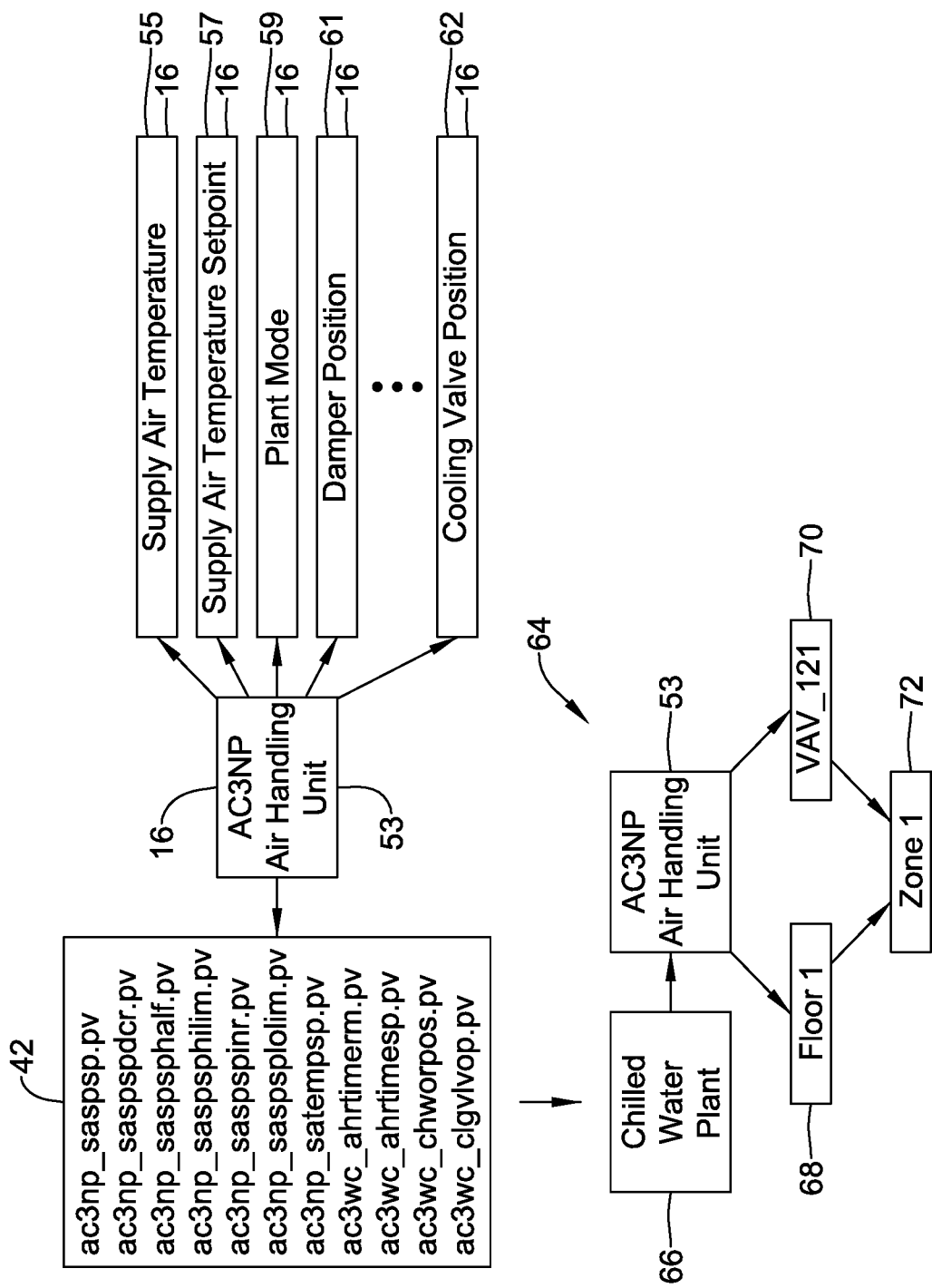
FIG. 5 is a schematic box diagram of an illustrative system for creating a knowledge graph.

FIG. 5 depicts a schematic diagram of a flow of data from a building automation system 10 into a schematic knowledge graph 64. The building automation system 10 may include a building automation system component 16, which in turn, may include one or more additional building automation system components 16. As depicted in FIG. 5, the building automation system 10 may include an air handling unit AC3NP 53, which may include a supply air temperature sensor 55, a supply air temperature setpoint controller 57, a plant mode controller 59, a damper position sensor 61, and a cooling valve position sensor 62. It is contemplated that the building automation system may include other suitable building automation system components 16.

Based, at least in part, on the building automation system components 16 of the building automation system 10, naming data 42 may be developed or culled. In some cases, naming data 42 may be developed or culled for each controllable building automation system component 16 and/or building automation system component 16 having an electronic input and/or output. The developed or culled naming data 42, along with other suitable data such as telemetry data, schematics data and/or other suitable unstructured data may be utilized to form a knowledge graph 64.

The knowledge graph 64 may be developed in response to applying learning algorithms and/or other analyses to data from the building automation system components 16. For example, a naming convention model may be used for predicting or identifying types or roles of building automation system components. In some cases, the name and relationship engine 46 and/or other suitable engine applying the naming convention model to the received data may leverage historical manual tagging, schematics data, etc. of building automation system components 16 as ground truths to train a fully connected neural network of the name and relationship engine. The naming convention model may be based, at least in part, on any suitable algorithm discussed herein for analyzing data to identify patterns in the data. The naming convention model may include multiple models created in-order to predict functional names for building automation system components performing different functions. Once determined, the names of the building automation system components 16 may be provided to the knowledge graph 64.

Once a type of building automation system component 16 has been determined, a uniform name for that type of component may be inserted into the knowledge graph 64 and the building automation system component 16 associated with the inserted uniform name may be linked to one or more other building automation system components 16. In the knowledge graph 64 of FIG. 5, a chilled water plant 66 has been previously identified as is indicated as including the air handling unit 53. The air handling unit 53 has been identified as servicing a floor 1 68 having a zone 1 72, where a variable air volume controller 70 may control the variable air volume to zone 1 72. Although not depicted in FIG. 5, schematics data may be utilized to find floor and/or zone information and confirm the accuracy of the knowledge graph. As more building automation system components 16 are identified, these identified building automation system components 16 may be added to the knowledge graph 64.

Figure 6:
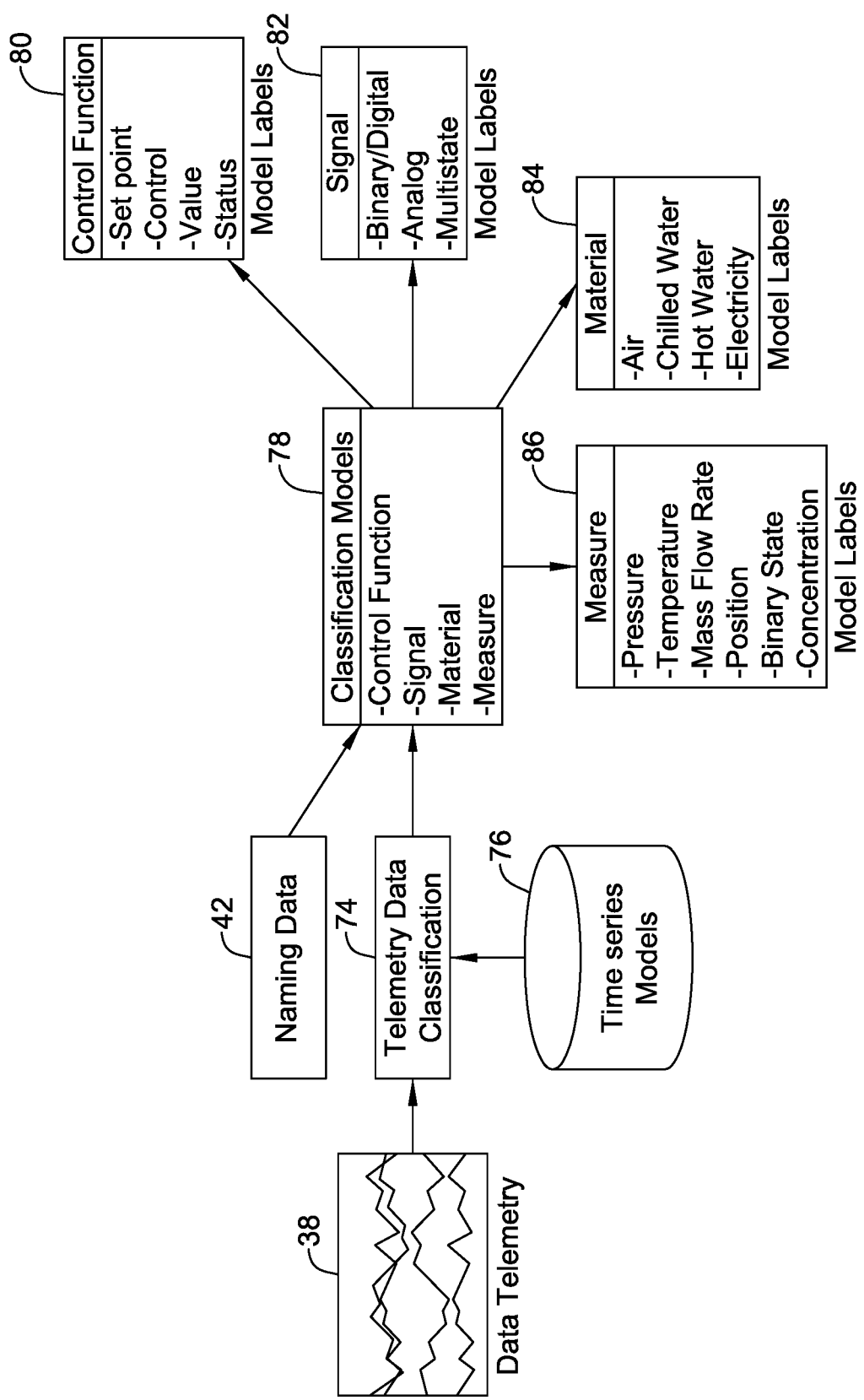
FIG. 6 is a schematic box diagram of an illustrative approach for analyzing data from building automation system components.

FIG. 6 is a schematic flow diagram of an illustrative approach for analyzing data from the building automation system components 16. In some cases, the illustrative approach may take place in the name and relationship engine 46 discussed above with respect to FIG. 2, but this is not required. The operations of FIG. 6 may take place in the computing device 14, and/or in any other suitable computing device, in an automated manner.

As shown in FIG. 6 telemetry data 38 and naming data 42 may be received (e.g., from building automation system controllers 16 and/or from one or more other suitable locations), among other types of data. The telemetry data 38 may be classified 74 using time series models 76 (e.g., which may be stored in the memory 20 and/or other suitable memory). In some cases, the time series models 76 may be applied to the telemetry data 38 to predict or identify types of building automation system components 16, to extract intricate time series features related to the operation of the building automation system components 16, and/or seasonal features. In one example, the time series models 76 may include a measure type model configured to identify different types of building automation system components 16, such as temperature sensors, pressure sensors, humidity sensors, etc. In the example, a recurrent neural network—gated recurrent unit (GRU) for creating the machine learning models may be utilized to identify different types of building automation system components 16.

Further, the time series models 76 may be applied to the telemetry data 38 to predict or establish relationships between building automation system components 16. For example, the time series models 76 may be configured to identify similarities and differences between telemetry data 38 of the building automation system components 16 with identified types and/or with applied uniform names. In the example, an autoregressive integrated moving average (ARIMA) analysis may be performed on the telemetry data 38 received and the output of this analysis may include characteristics of the telemetry data 38 tied to respective building automation system components 16. The characteristics of the telemetry data 38 may be clustered into similar clusters and based, at least in part, on these clusters, a kind of time series cluster may be identified for each cluster to facilitate determining the types of building automation system components for providing a uniform name.

In some cases, the clusters of telemetry data may be trained using regression models and neural networks to establish relationships between building automation system components 16. For example, the regression models and neural networks may look for instances when telemetry data associated with a first building automation system component 16 changes with or otherwise has a relationship with telemetry data associated with one or more other building automation system components 16. A training frequency of the clusters of telemetry data may be determined based, at least in part, on business needs, accuracy of the results, and an internal matrix of performance algorithms. Further, dynamic time warping and/or other suitable pattern finding algorithms may be used to find patterns similar to predefined or pre-identified patterns, which may be a buffer to the regression models and neural networks used to train the clusters of telemetry data.

When relationships between building automation system components 16 are established, these relationships may be documented or stored in lookup tables captured in memory (e.g., memory 20 and/or other suitable memory), knowledge graphs, and/or other suitable databases (e.g., uniform name databases, etc.). The lookup tables, knowledge graphs, and/or other suitable databases may be used as standards and may be accessible to determine relationships of building automation system components 16 (e.g., for determining what effect raising a temperature of a room will have on temperature, pressure, valve position, etc. in a hallway adjacent to the room in which the temperature is to be raised).

In the illustrative approach of FIG. 6, once the telemetry data have been classified, the telemetry data may be passed to the classification model for determining the types of the building automation system components 16 from which the data (e.g., telemetry data 38 and naming data 42 (e.g., initially assigned names) came. The classification models may be configured to identify patterns in the initially assigned names of the building automation system components 16, along with the telemetry data 38 in some cases, to identify or otherwise output the types of the building automation system components 16 and apply an associated uniform name to the building automation system component based, at least in part, on the identified types. In some cases, the types the classification model may determine from patterns in the initially assigned names may include, but are not limited to, types of control functions (e.g., set point control, operational control, value of operations control, status control, etc.) the building automation system component 16 performs, types of signal (e.g., binary signals, digital signals, analog signals, multistate signals, etc.) inputted to and/or outputted from the building automation system component 16, types of materials (e.g., air, chilled water, hot water, boiler water, electricity, gas, etc.) controlled by the building automation system component 16, types of measures (e.g., pressure measurements, temperature measurements, mass flow rate measurements, position measurements, binary state measurements, concentration measurements, etc.) inputted to or outputted by the building automation system component 16, and/or one or more other suitable types of features of the building automation system components 16. Naming data 42 and telemetry data classification 74 may provide information to classification models 78 for control function, signal, measure, and so forth. Outputs from classification models 78 may go to model labels for control function 80 (set point, control, value, status, and so on), signal 82 (binary/digital, analog, multistate, and so on), material 84 (air, chilled water, hot water, electricity, and so on), and measure 86 (pressure, temperature, mass flow rate, position, binary state, concentration, and so on).

The present system may have a software component. As to a stack level, consumption may be domain specific, and have differentiated software enabled offerings and services delivered via cloud or private enterprise network. A software type may be connected/connectivity as an offering available through a cloud or direct, remote connection (software as a service—SaaS) or cover infrastructure enabling connected services (sentience). The present system may generate or capture data. The type of data may incorporate telemetry, model and building schematics.

The system may relate to a connected building SPOG, OBS. U.S. patent application Ser. No. 13/912,682, filed Jun. 7, 2013, is hereby incorporated by reference.

To recap, in one example, a method of establishing relationships between building automation system components configured to facilitate automated control of a building may be provided. The method may include receiving data for a building automation system component, applying a model to the data received for the building automation system component, applying a uniform name to the building automation system component based on results of applying the model to the data received for the building automation system component and storing the uniform name in a database, and establishing a relationship between the building automation system component and one or more other building automation system components based on results of applying the model to the data received for the building automation system component.

In some cases, the method may include controlling operation of the building automation system component based on the uniform name applied and the relationship established between the building automation system component and the one or more other building automation system components.

In some cases, the establishing the relationship between the building automation system component and the one or more other building automation system components may include creating an association between the building automation system component and the one or more other building automation system components.

In some cases, the method may include establishing one or more of automated alarm prioritizations, diagnostics, digital twin creations, and maintenance workflows. Establishing one or more of alarm prioritizations, diagnostics, digital twin creations, and maintenance workflows may occur in response to establishing the relationship between the building automation system component and the one or more other building automation system components.

In some cases, the method may be configured such that receiving data include receiving one or more of name data for the building automation system component, schematic data for the building automation system component, and time series operational data for the building automation system component.

In some cases, the method may be configured such that applying the model to the data received for the building automation system component comprises applying a first model to the data received and applying the uniform name to the building automation system component based on results of applying the first model to the data received, and applying a second model to the data received and establishing a relationship between the building automation system component and one or more other building automation system components based on results of applying the second model to the data received.

In some cases, the method may be configured such that the data received include name data for the building automation system and time series operational data for the building automation system component, and the applying the uniform name to the building automation system component is based on results of applying the model to the name data and the time series operational data.

In some cases, the method may include inserting the building automation system component with the uniform name applied in a knowledge graph, and linking the building automation system component with the one or more other building automation system components.

In some cases, the method may be configured such that upon receiving the data for the building automation system component, a processor automatically performs the applying the model to the data received for the building automation system component, the applying the uniform name to the building automation system component based on results of applying the model to the data received for the building automation system component and storing the uniform name in the database, and the establishing a relationship between the building automation system component and the one or more other building automation system components based on the results of applying the model to the data received for the building automation system component and creating an association between the building automation system component and the one or more other building automation system components.

In another example, a computer readable medium having stored thereon in a non-transitory state a program code for use by a computing device, where the program code may cause the computing device to execute a method of operating a building automation system. The method may include receiving data for a building automation system component, applying a model to the data received for the building automation system component, applying a uniform name to the building automation system component based on results of applying the model to the data received for the building automation system component and storing the uniform name in a database, and establishing a relationship between the building automation system component and one or more other building automation system components based on results of applying the model to the data received for the building automation system component.

In some cases, the computer readable medium may be further configured such that the method includes controlling operation of the building automation system component based on the uniform name applied and the relationship established between the building automation system component and the one or more other building automation system components.

In some cases, the computer readable medium may be configured such that the establishing the relationship between the building automation system component and the one or more other building automation system components may include creating an association between the building automation system component and the one or more other building automation system components.

In some cases, the computer readable medium may be configured such that the method includes establishing one or more of automated alarm prioritizations, diagnostics, digital twin creations, and maintenance workflows in response to establishing the relationship between the building automation system component and the one or more other building automation system components.

In some cases, the computer readable medium may be configured such that applying the model to the data received for the building automation system component includes applying a first model to the data received and applying the uniform name to the building automation system component based on results of applying the first model to the data received, and applying a second model to the data received and establishing a relationship between the building automation system component and one or more other building automation system components based on results of applying the second model to the data received.

In some cases, the computer readable medium may be configured such that applying the model to the data received for the building automation system component includes applying an artificial neural network algorithm to the data received.

In some cases, the computer readable medium may be configured such that upon receiving the data for the building automation system component, the program code causes the computing device to automatically perform the applying the model to the data received for the building automation system component, the applying the uniform name to the building automation system component based on results of applying the model to the data received for the building automation system component and storing the uniform name in the database, and the establishing a relationship between the building automation system component and the one or more other building automation system components based on the results of applying the model to the data received for the building automation system component and creating an association between the building automation system component and the one or more other building automation system components.

In a further example, a controller for automatically creating an association between a building automation system component and one or more other building automation system components may be provided. The controller may include a processor and memory configured to store in a non-transitory state instructions executable by the processor to cause the processor to apply a model to name data for a building automation system component and time series operational data for the building automation system component, apply a uniform name to the building automation system component based on results of applying the model to the name data and storing the uniform name in a database, and establish a relationship between the building automation system component and one or more other building automation system components based on results of applying the model to the time series operational data.

The controller may include instructions executable by the processor to cause the processor to control operation of the building automation system component based on the uniform name applied and the relationship established between the building automation system component and the one or more other building automation system components.

The controller may be configured such that the uniform name is applied to the building automation system component based on results of applying the model to the name data and results of applying the model to the time series operational data.

The controller may include instructions executable by the processor to cause the processor to insert the building automation system component with the uniform name applied in a knowledge graph, link the building automation system component with the one or more other building automation system components, and monitor the building automation system component based on the uniform name applied and the link between the building automation system component and the one or more other building automation system components.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. An automated method of establishing relationships between building automation system components configured to facilitate automated control of a building, the method comprising:
   receiving data for a building automation system component, the data received includes schematic data for the building automation system component and time series operational data for the building automation system component;
   applying a model to the schematic data and the time series operational data received for the building automation system component to obtain results of applying the model to the data, wherein the results include a type of the building automation system component;
   applying a uniform name to the building automation system component based on the type of the building automation system component and storing the uniform name in a database; and
   establishing a relationship between the building automation system component and one or more other building automation system components based on the results of applying the model to the data received for the building automation system component.

2. The method of claim 1, further comprising:
   controlling operation of the building automation system component based on the uniform name applied and the relationship established between the building automation system component and the one or more other building automation system components.

3. The method of claim 1, wherein the establishing the relationship between the building automation system component and the one or more other building automation system components comprises:
  creating an association between the building automation system component and the one or more other building automation system components.

4. The method of claim 1, further comprising:
  establishing one or more of automated alarm prioritizations, diagnostics, digital twin creations, and maintenance workflows in response to establishing the relationship between the building automation system component and the one or more other building automation system components.

5. The method of claim 1, wherein the receiving data includes receiving name data for the building automation system component and applying the model includes applying the model to the name data received for the building automation system component to obtain the results.

6. The method of claim 1, wherein the applying the model to the data received for the building automation system component comprises:
  applying a first model to the data received and applying the uniform name to the building automation system component based on results of applying the first model to the data received; and
  applying a second model to the data received and establishing a relationship between the building automation system component and one or more other building automation system components based on results of applying the second model to the data received.

7. The method of claim 1, wherein:
  the data received includes name data for the building automation system and time series operational data for the building automation system component; and
  the applying the uniform name to the building automation system component is based on results of applying the model to the name data and the time series operational data.

8. The method of claim 1, further comprising:
  inserting the building automation system component with the uniform name applied in a knowledge graph; and
  linking the building automation system component with the one or more other building automation system components.

9. The method of claim 1, wherein upon receiving the data for the building automation system component, a processor automatically performs the following:
  the applying the model to the data received for the building automation system component;
  the applying the uniform name to the building automation system component based on results of applying the model to the data received for the building automation system component and storing the uniform name in the database; and
  the establishing a relationship between the building automation system component and the one or more other building automation system components based on the results of applying the model to the data received for the building automation system component and creating an association between the building automation system component and the one or more other building automation system components.

10. A computer readable medium having stored thereon in a non-transitory state a program code for use by a computing device, the program code causing the computing device to execute a method of operating a building automation system comprising:
  receiving data for a building automation system component, the data received includes schematic data for the building automation system component and time series operational data for the building automation system component;
  applying a model to the schematic data and the time series operational data received for the building automation system component to obtain results of applying the model to the data, wherein the results include a type of the building automation system component;
  applying a uniform name to the building automation system component based on the type of the building automation system component and storing the uniform name in a database; and
  establishing a relationship between the building automation system component and one or more other building automation system components based on results of applying the model to the data received for the building automation system component.

11. The computer readable medium of claim 10, wherein the method further comprises:
  controlling operation of the building automation system component based on the uniform name applied and the relationship established between the building automation system component and the one or more other building automation system components.

12. The computer readable medium of claim 10, wherein the establishing the relationship between the building automation system component and the one or more other building automation system components comprises:
  creating an association between the building automation system component and the one or more other building automation system components.

13. The computer readable medium of claim 10, wherein the method further comprises:
  establishing one or more of automated alarm prioritizations, diagnostics, digital twin creations, and maintenance workflows in response to establishing the relationship between the building automation system component and the one or more other building automation system components.

14. The computer readable medium of claim 10, wherein the applying the model to the data received for the building automation system component comprises:
  applying a first model to the data received and applying the uniform name to the building automation system component based on results of applying the first model to the data received; and
  applying a second model to the data received and establishing a relationship between the building automation system component and one or more other building automation system components based on results of applying the second model to the data received.

15. The computer readable medium of claim 10, wherein the applying the model to the data received for the building automation system component comprises:
  applying an artificial neural network algorithm to the data received.

16. The computer readable medium of claim 10, wherein upon receiving the data for the building automation system component, the program code causes the computing device to automatically perform the following:
  the applying the model to the data received for the building automation system component;
  the applying the uniform name to the building automation system component based on results of applying the model to the data received for the building automation system component and storing the uniform name in the database; and the establishing a relationship between the building automation system component and the one or more other building automation system components based on the results of applying the model to the data received for the building automation system component and creating an association between the building automation system component and the one or more other building automation system components.

17. A controller for automatically creating an association between a building automation system component and one or more other building automation system components, the controller comprising:

a processor; and memory configured to store in a non-transitory state instructions executable by the processor to cause the processor to:

apply a model to name data for a plurality of building automation system components, schematic data for the plurality of building automation system components, and time series operational data for the plurality of building automation system components to obtain results of applying the model to the name data, wherein name data for one or more of the plurality of building automation system components differs from at least one other of the plurality of building automation system components and the results include a type of each of the building system components;

apply a uniform name to each of the plurality of building automation system components based on the type of the building system component and storing the uniform name in a database; and establish a relationship between each of the plurality of building automation system components and one or more other building automation system components based on results of applying the model to the time series operational data.

18. The controller of claim 17, wherein the instructions executable by the processor are further configured to cause the processor to:

control operation of one or more of the plurality of building automation system components based on the uniform name applied and the relationship established between the plurality of building automation system components and the one or more other building automation system components.

19. The controller of claim 17, wherein the uniform name is applied to each of the plurality of building automation system components based on results of applying the model to the name data and results of applying the model to the time series operational data.

20. The controller of claim 17, wherein the instructions executable by the processor are further configured to cause the processor to:

insert each of the plurality of building automation system components with the uniform name applied in a knowledge graph;

link each of the plurality of building automation system components with the one or more other building automation system components; and monitor each of the plurality of building automation system components based on the uniform name applied and the link between each of the plurality of building automation system components and the one or more other building automation system components.

* * * * *